Figure 1:
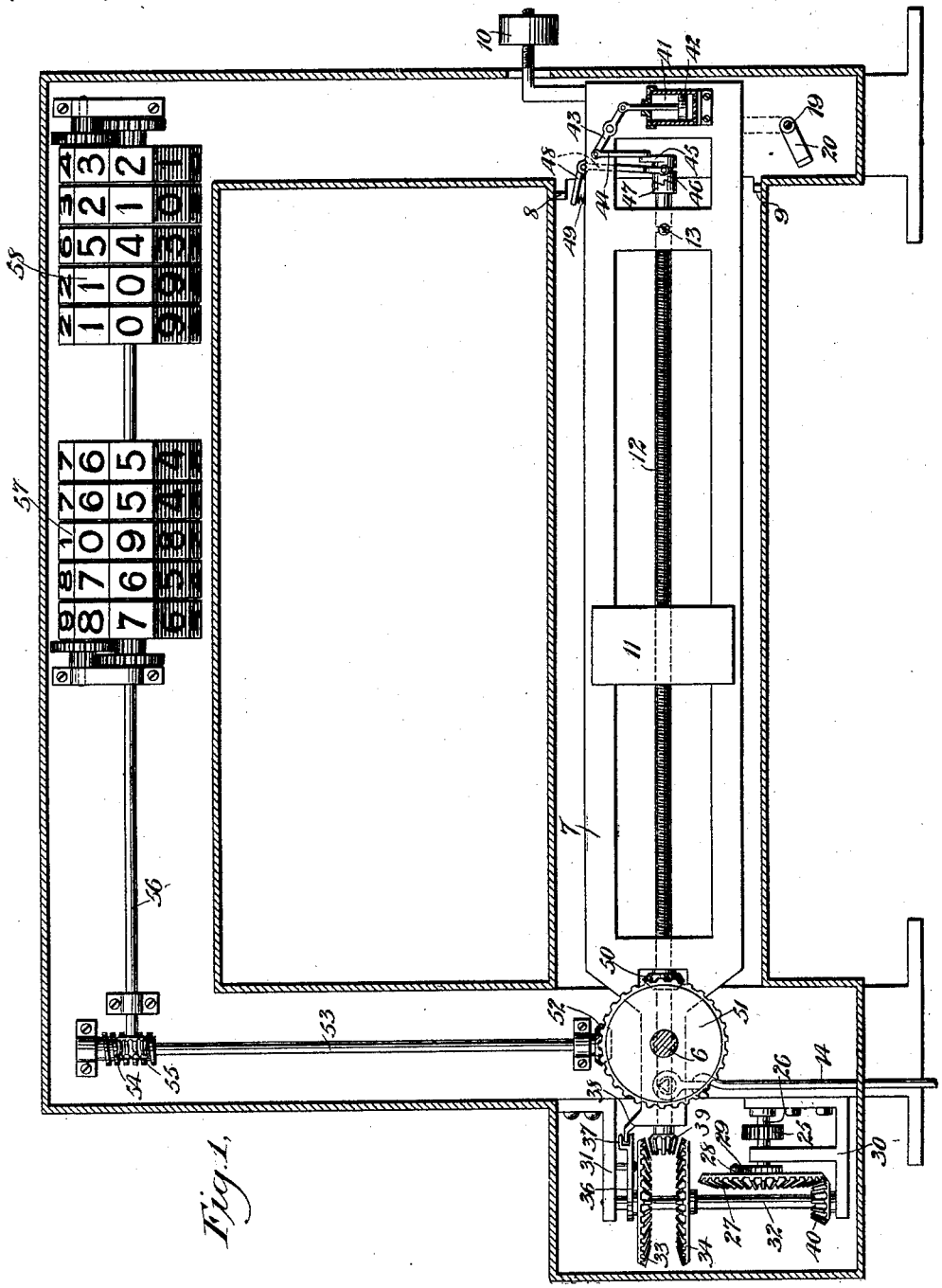

No. 624,374. Patented May 2, 1899.
L. D. ORR.
WEIGHING APPARATUS.
(Application filed Mar. 5, 1898.)
(No Model.) 2 Sheets—Sheet 1.

WITNESSES: Edward Thorpe. Isaac Orr.

INVENTOR L. D. Orr.
BY
ATTORNEYS.

No. 624,374. Patented May 2, 1899.
L. D. ORR.
WEIGHING APPARATUS.
(Application filed Mar. 5, 1898.)
(No Model.) 2 Sheets—Sheet 2.
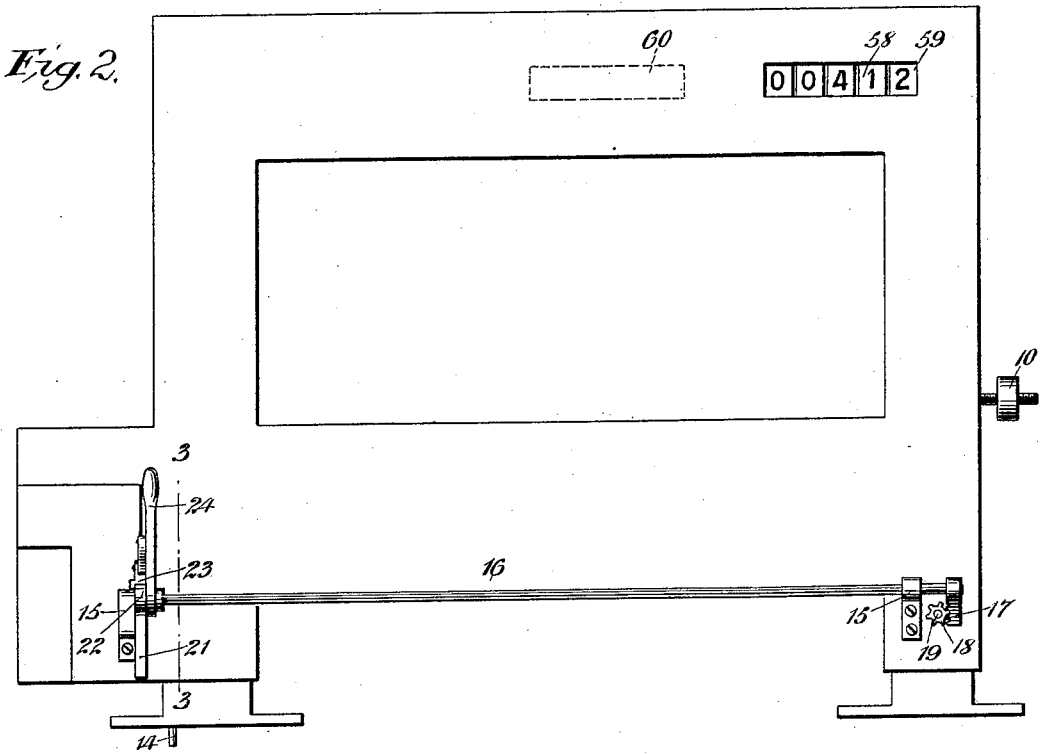
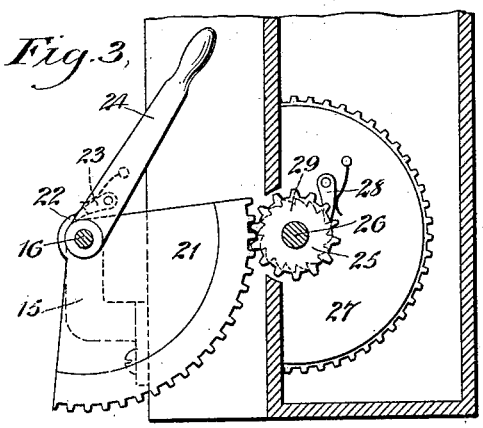
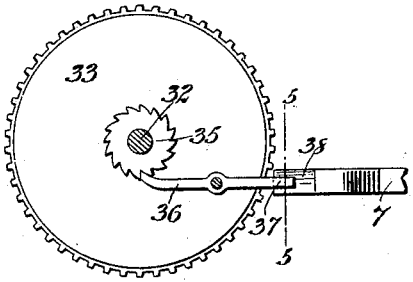
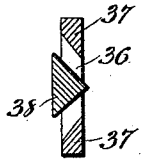
WITNESSES:
Edward Thorpe
Isaac W...
INVENTOR
L. D. Orr,
BY
ATTORNEYS.

UNITED STATES PATENT OFFICE.

LEONARD DENVER ORR, OF PEGRAM, ILLINOIS.

WEIGHING APPARATUS.

SPECIFICATION forming part of Letters Patent No. 624,374, dated May 2, 1899.

Application filed March 5, 1898. Serial No. 672,670. (No model.)

*To all whom it may concern:*

Be it known that I, LEONARD DENVER ORR, of Pegram, in the county of Greene and State of Illinois, have invented a new and Improved Weighing Apparatus, of which the following is a full, clear, and exact description.

This invention is an apparatus embodying a scale-beam with a counterpoise adjustable thereon by means of suitable driven gearing, the movement of which is controlled by the position of the beam, the said gearing serving also to drive a numbering apparatus for indicating the weight of the article handled.

This specification is the disclosure of one form of my invention, while the claims define the actual scope thereof.

Reference is to be had to the accompanying drawings, forming a part of this specification, in which similar characters of reference indicate corresponding parts in all the figures.

Figure 1 is a vertical section of the invention. Fig. 2 is a front elevation of the invention. Fig. 3 is a detail section on the line 3 3 of Fig. 2. Fig. 4 is a plan view looking down on a fragment of the gearing and showing the pawl for releasing the gearing by the movement of the pawl, and Fig. 5 is a detail section on the line 5 5 of Fig. 4.

The operative parts of the invention are inclosed in a frame and casing which may have any desired form. Held rigidly by the frame is a shaft 6, on which the beam 7 of the scale is mounted to swing, the movement of the beam being limited at its free end by means of abutments 8 and 9, located, respectively, above and below the beam. A threaded arm with a pea 10 thereon extends through the casing, so that the balance of the beam may be regulated to the required nicety. Held to slide along the beam 7 is a counterpoise 11, through which passes a threaded shaft 12. The shaft 12 is mounted to turn freely in the beam 7 and extends throughout the length thereof, the outer end of the shaft being held by means of a set-screw 13, entering an annular groove in the shaft, as indicated by dotted lines in Fig. 1, and the inner portion of the shaft 12 passing loosely through an opening in the shaft 6, so that the shaft 12 may have the necessary swinging movement with the beam 7 without interference from the shaft 6. The inner or short end of the beam 7 is connected by means of a rod 14 with the platform of the scale, which platform is not shown.

Mounted in brackets 15, attached to the outside of the frame and casing, is a shaft 16, to the right-hand end of which is attached a sector 17, meshing with a bevel-pinion 18, fast on the shaft 19, which extends transversely of the shaft 16 and into the casing. As shown in Fig. 1, the shaft 19 carries an arm 20, that is capable of extending upward, as the dotted lines in said figure show, so as to engage the under edge of the beam 7 and lock the beam against the abutment 8 to prevent the movement of the beam. Whenever the shaft 16 turns in one direction, it throws the arm 20 up, and when the shaft 16 turns in the opposite direction it turns the arm 20 down, so that the beam is periodically locked and unlocked. The left-hand end of the shaft 16 carries loosely a weighted sector 21. The sector 21 has a shoulder 22 on the hub thereof, which shoulder coacts with a pawl 23, pivoted to an arm 24, made fast to the shaft 16 alongside of the sector 21. Now when the arm is thrown up to the position shown in Fig. 3 the pawl 23 engages with the shoulder 22, and the sector 21 is thus held fast on the shaft 16, so that by throwing the arm 24 forward and downward the sector 21 is raised from the position shown in Fig. 3. This forward-and-downward movement of the arm 24 and the consequent upward movement of the sector 21 is timed to occur when the arm 20 is moved down away from the beam 7 to the position shown by full lines in Fig. 1. The weighted sector 21 serves to furnish the motive power for driving the hereinbefore-mentioned gearing, and as the weight is lifted it is restored to the position which it occupied immediately before starting the gearing in motion. Consequently it is then necessary to release the beam 7 from the arm 20.

The sector 21 meshes with a pinion 25, which is fast to a short shaft 26, mounted revolubly in a suitable support 30, mounted in the frame and casing. The pinion 25 projects through an orifice in the frame and casing, as shown best in Fig. 3. As the sector 21 descends it drives the pinion 25 and shaft 26. Revolubly mounted on the shaft 26 is a bevel-gear 27, having a spring-pressed pawl 28 pivoted thereon and engaging a ratchet 29, fast to the shaft 26. When the sector 21 moves up from the position shown in Fig. 3, the shaft 26 is driven reversely; but this movement is not imparted to the bevel-gear 27, owing to the pawl and ratchet 28 and 29. When, however, the sector 21 drops and the shaft 26 is driven in the opposite direction, the illustrated disposition of the pawl 28 and ratchet 29 serves to impart revoluble movement to the gear 27. Revolubly mounted in an arm of the support 30 and in a bracket 31, held rigidly above the support 30, is a vertical shaft 32, provided with two fast and oppositely-disposed bevel-gears 33 and 34. Fixed to the shaft 32 and located above the gear 33 is a ratchet 35, which coacts with a pawl 36, pivoted to a pin projecting down from the support 30. As shown best in Fig. 5, the pawl 36 is provided with a fork at the end opposite the end engaging the ratchet 35, such fork having its two arms 37 provided with oppositely-inclined inner faces, between which works the double-beveled projection 38 of the inner end of the beam 7. As the projection 38 moves with the beam 7 alternately against the inclined or bevel faces of the arms 37 of the fork on the pawl 35 the pawl is forced to swing on its pivot into and out of engagement with the ratchet 36. Consequently the moment that the beam 7 swings upon the application of weight to the scale the projection 38 engages the fork of the pawl 36 and throws the pawl to disengage the ratchet 35. The inner end of the shaft 12 carries a bevel-gear 39, which is normally out of engagement with both the gears 33 and 34, but which moves to engage one or other of the said gears whenever the beam 7 is thrown from its normal and intermediate position. With the parts thus arranged and with weight applied to the beam 7 through the medium of the rod 14 the beam is thrown up at its free end, so that the gear 39 is engaged with the gear 34. The attendant now raises the sector 21, which when released turns the shaft 26 and also the shaft 32 through the medium of the gear 27 and of the bevel-pinion 40, which is fast to the shaft 32 and meshed with the gear 27. As the shaft 32 turns the shaft 12 is driven through the gears 34 and 39 and the counterpoise 11 is moved along the beam 7. When the scale has been used once, the counterpoise 11 is left in the position to which it was put at such use and is not returned to a zero or starting point. Now when the scale is used a second time, according to the weight of the material placed on the platform, the beam 7 will be either raised or lowered. Should the previous adjustment of the counterpoise 11 be greater than the amount of the material handled, the beam will drop; but should the weight of the material be greater than the influence exerted by the counterpoise 11 the beam 7 will be raised. The raising of the free end of the beam 7 throws the gear 39 into engagement with the gear 34, as has been previously described, and this engagement of gears is such that the counterpoise 11 will be moved outward along the beam 7 to balance the material on the platform, and thus throw down the free end of the beam 7. The engagement between the gears 34 and 39 continues until the beam 7 is balanced, whereupon the beam, moving to balanced or intermediate position, as shown in Fig. 1, will swing the gear 39 to a position intermediate the gears 33 and 34, and thus the movements of the shaft 12 will be stopped. The gearing between the sector 21 and the wheels 33 and 34 will continue to run until the sector 21 is dropped to the position shown in Fig. 3, but the action of this continued movement will not be transmitted to the shaft 12. When the sector 21 has dropped to the position shown in Fig. 3, the arm 24 should then be moved up to the position also shown in said figure, so as to throw the arm 20 against the beam and lock the beam, in which position the parts remain until an additional operation of the scale is desired.

In order to immediately restrain and regulate the movement of the shaft 12, I provide a dash-pot 41, wherein works a piston 42, the rod of which is connected with a lever 43, mounted on the beam 7. A link 44 is pivoted to the lever 43 and also to a crank-arm 45, forming part of a clutch member 46, loose on the outer end of the shaft 12. The clutch member 46 is designed to coact with a clutch member 47, fast to the outer end of the shaft 12. A bell-crank lever 48 is mounted in the beam 7, and one arm engages the loose clutch member 46, while the other arm is pressed by a spring 49, which normally throws the clutch members together. When the beam 7 is raised at its outer end by the action of material on the platform of the scale, the horizontal or short arm of the bell-crank 48 is contacted with the abutment 8, and thus the clutch member 46 is thrown out of engagement with the clutch member 47. At this time no restraint of the shaft 12 is desirable, because it is proper for the shaft to turn rapidly and effect a quick adjustment of the counterpoise 11; but the moment that the beam 7 drops and begins to resume its equilibrium it is necessary to retard the shaft 12 previous to actually stopping it, and as the beam drops the spring 49 is permitted to throw the bell-crank lever to its normal position, which is that shown in Fig. 1, whereupon the clutch member 47 transmits movement to the clutch member 46 to drive the crank 45. The action of the piston 42 in the dash-pot 41 then operates to retard the movement of the shaft 12, so that when actual equilibrium is attained the speed of the shaft 12 will be so reduced as to permit the shaft to stop at the proper moment.

Fast on the shaft 12 and situated in an orifice in the beam 7 is a bevel-gear 50, which meshes with a large bevel-gear 51, turning loose on the shaft 6. The bevel-gear 51 also meshes with a small bevel-gear 52, secured to a shaft 53, which is revolubly mounted in a vertical arm of the frame and casing. The upper end of the shaft 53 carries a worm 54, which meshes with a worm-wheel 55, fast to a shaft 56, revolubly mounted in a horizontal arm of the frame and casing. The shaft 56 carries suitable numbering apparatus 57 and 58, the latter of which is visible through an orifice 59 in the front of the frame and casing and the former of which is visible through an orifice 60 in the rear of the frame and casing as indicated by dotted lines in Fig. 1. An article placed on the platform of the scale or weighing apparatus will throw the scale-beam to one or the other of its extreme positions, and thus cause the movement of the gearing to be transmitted to the counterpoise 11, which adjusts the beam and stops the action of the counterpoise as well as that of the shaft 12. Simultaneously with the movement of the shaft 12 the shafts 56 and 53 are driven from the shaft 12, and thus the numbering apparatus is driven. The numbering apparatus stops the instant that the shaft 12 stops. The exact weight of the material handled may thus be determined by knowing the difference between the numbering apparatus before and after the operation.

A scale constructed according to my invention is absolutely exempt from the liability of fraud, since the frame and casing inclose the working parts and make it impossible to tamper with them. The beam when balanced is stopped with machine precision, and the result is indicated by the numbering apparatus in a manner which renders fraud absolutely impossible. The arm 20 is timed to work in unison with the other parts, so as to hold and release the scale-beam according to the operations to be performed. The counterpoise 11 moves irregularly from one point to another along the scale-beam according to the amount of the material handled and without the intervention or control of the attendant person.

Having thus described my invention, I claim as new and desire to secure by Letters Patent—

1. In a weighing apparatus the combination of two gear-wheels, a scale-beam mounted adjacent to the gear-wheels, a counterpoise running on the scale-beam, a threaded shaft turning in the scale-beam and driving the counterpoise and projecting between the two gears, and a gear fixed to the threaded shaft and capable of moving with the same to alternately engage the first-named gears.

2. The combination of a scale-beam, a counterpoise mounted thereon, means on the beam for moving the counterpoise forward and back to balance the beam, and two gears mounted adjacent to the scale-beam and alternately engaged by said means.

3. In a weighing apparatus, the combination of a scale-beam, a counterpoise movable thereon, a shaft mounted to turn on the scale-beam and driving the counterpoise, a gear-wheel fixed to the shaft, and two additional gear-wheels mounted adjacent to the beam and between which the first-named gear extends, so that the first-named gear alternately engages the other gear as the scale-beam swings.

4. In a weighing apparatus, the combination of gearing comprising a motor and two gear-wheels mounted adjacent to each other and on a common axis, a scale-beam mounted adjacent to the two gear-wheels, a counterpoise on the scale-beam, a threaded shaft mounted on the scale-beam and having connection with the counterpoise to move the same, and a gear-wheel attached to the threaded shaft and projecting between the two first-named gear-wheels to alternately engage the same.

5. In a weighing apparatus, the combination of driven gearing having two gear members capable of imparting movements in opposite directions, a scale-beam mounted adjacent to said gear members, a counterpoise, means for moving the counterpoise on the scale-beam, and an additional gear carried by said means and alternately engaging the gear members as the beam swings.

6. In a weighing apparatus, the combination of driven gearing, a scale-beam mounted adjacent thereto, and balancing devices for the scale-beam, such devices being driven by the gearing as the beam swings to move said devices into proximity with the gearing.

7. In a weighing apparatus, the combination with a frame and casing, of a scale-beam mounted therein, means on the beam for balancing the same, a gear-wheel carried by said means and swinging with the beam, two gears between which the first-named gear extends, a vertical shaft on which the two gears are carried, a horizontal shaft geared with the vertical shaft, and a weighted sector geared with the horizontal shaft.

8. In a weighing apparatus, the combination of driven gearing comprising a weighted sector from which motive power is derived, and two gear members juxtaposed to each other, a scale-beam mounted to swing adjacent to the gearing, means on the scale-beam for balancing the same, and a gear in connection with said means and extending between the said gear members to alternately engage the same.

9. The combination of a gear-wheel, means for driving the same, a pawl normally restraining the gear-wheel, a scale-beam mounted adjacent to the gear-wheel and having a member engaging the pawl to swing the pawl to release the gear-wheel, and means on the scale-beam for balancing the beam, such means being driven by the gear-wheel.

10. The combination of a swinging beam, a gear-wheel moving therewith, a gear-wheel mounted adjacent to the beam and actuated by the movement of the first-named gear-wheel, and a pawl normally restraining the second-named gear-wheel and released by the movement of the swinging beam.

11. The combination of a swinging beam, a shaft mounted therein, a clutch member fast to the shaft, a second clutch member loose on the shaft, a bell-crank lever in connection with the loose clutch member to move the same, a crank-arm forming part of the loose clutch member, a dash-pot mounted on the swinging beam, a piston in the dash-pot, and connections between the piston and the crank-arm.

12. The combination of a swinging beam, a revoluble shaft mounted thereon, and a dash-pot in connection with the revoluble shaft to regulate the movement thereof.

13. The combination of a swinging beam, a driven member mounted thereon, a dash-pot carried on the swinging beam, and connections between the dash-pot and said driven member to regulate the movements of the latter.

14. In a weighing apparatus, the combination with a frame and casing, of a scale-beam swinging therein, a revoluble shaft mounted in the scale-beam, clutch devices carried on the shaft, means carried by the beam for throwing the clutch devices, such means being engaged with the frame and casing as the beam swings, and a dash-pot carried by the beam and having connection with the clutch.

15. In a weighing apparatus, the combination with a frame and casing, of a scale-beam mounted therein, a swinging locking-arm, a pinion in connection and coacting with said locking-arm, a rock-shaft, and a sector carried on the shaft and meshed with the pinion.

16. In a weighing apparatus, the combination with a frame and casing, of a scale-beam, means controlling the scale-beam, a shaft in connection with said means, a sector attached to the shaft, a pinion meshed with the sector, a short shaft on which the pinion is carried, and a locking-arm carried on the short shaft and coacting with the beam.

17. In a scale, the combination of a scale-beam, a threaded shaft moving therewith and revoluble independently thereof, a counterpoise sliding on the beam and actuated by the shaft to move backward or forward thereon, gearing for turning the shaft in either direction, and means for arresting the movement of the shaft when the counterpoise balances the beam.

18. The combination of a scale-beam, a counterpoise sliding on the scale-beam, means movable with the scale-beam for advancing the counterpoise in either direction, so as to balance the beam, gearing for driving said means, and arresting devices for stopping the movement of said means when the counterpoise balances the beam.

19. The combination of a scale-beam, a counterpoise sliding on the scale-beam, means moving with the beam for adjusting the counterpoise, gearing transmitting movement to said means, and a gravity-motor serving to drive the gearing.

LEONARD DENVER ORR.

Witnesses:
LEE ORR,
JANE AGEE.